United States Patent
Brown

(10) Patent No.: US 9,733,342 B1
(45) Date of Patent: Aug. 15, 2017

(54) RADAR TARGET SIMULATION USING A HIGH SPEED TUNABLE SHORT

(71) Applicant: Waymo LLC, Mountain View, CA (US)

(72) Inventor: Adam Brown, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 289 days.

(21) Appl. No.: 14/608,531

(22) Filed: Jan. 29, 2015

(51) Int. Cl.
*G01S 7/40* (2006.01)
*H01Q 3/20* (2006.01)

(52) U.S. Cl.
CPC .............. *G01S 7/4052* (2013.01); *H01Q 3/20* (2013.01); *G01S 2007/4078* (2013.01)

(58) Field of Classification Search
CPC ........ H01P 3/12; H01P 11/001; H01P 11/002; H01P 1/30; H01P 3/081; G01S 7/4021; H01Q 13/0283
USPC .......................................................... 342/171
See application file for complete search history.

(56) References Cited

U.S. PATENT DOCUMENTS

| | | | |
|---|---|---|---|
| 3,108,274 A | 10/1963 | Yount et al. | |
| 3,110,026 A | 11/1963 | Charles et al. | |
| 3,216,014 A * | 11/1965 | Kerr | G01S 7/4021 33/32.3 |
| 6,535,162 B1 | 3/2003 | Butler | |

FOREIGN PATENT DOCUMENTS

GB        924208        4/1963

* cited by examiner

*Primary Examiner* — Timothy A Brainard
(74) *Attorney, Agent, or Firm* — McDonnell Boehnen Hulbert and Berghoff LLP

(57) ABSTRACT

Disclosed here are apparatuses and methods including a waveguide having a length and a port. The waveguide is a split-block construction waveguide, which includes a seam between a first waveguide section and a second waveguide section. The first waveguide section and the second waveguide section form a waveguide cavity, and the seam corresponds to a low surface current location of a propagation mode of the waveguide. The apparatus also includes an antenna coupled to the port of the waveguide. The antenna is configured to (i) receive an electromagnetic signal and propagate the electromagnetic signal into the waveguide, and (ii) transmit a reflected electromagnetic signal from the waveguide. Additionally, the apparatus includes a reflecting component. The reflecting component is configured to provide a short in the waveguide along the length of the waveguide, and to move with a velocity to simulate a radar target having the velocity.

20 Claims, 12 Drawing Sheets

RADAR TARGET SIMULATION USING A HIGH SPEED TUNABLE SHORT

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to a millimeter (mm) wave electromagnetic wave length (e.g., 3.9 mm for 77 GHz). These radar systems may use antennas that can focus the radiated energy into tight beams in order to enable the radar system to measure an environment with high accuracy, such as an environment around an autonomous vehicle. Such antennas may be compact (typically with rectangular form factors), efficient (i.e., with little of the 77 GHz energy lost to heat in the antenna or reflected back into the transmitter electronics), and low cost and easy to manufacture (i.e., radar systems with these antennas can be made in high volume).

SUMMARY

Disclosed herein are embodiments that relate to methods and apparatuses for the simulation of radar targets. In one aspect, the present application describes an apparatus including waveguide having a length and a port. The waveguide is a split-block construction waveguide that includes a seam between a first waveguide section and a second waveguide section. The first waveguide section and the second waveguide section form a waveguide cavity, and the seam corresponds to a low surface current location of a propagation mode of the waveguide. The apparatus also includes an antenna coupled to the port of the waveguide. The antenna is configured to (i) receive an electromagnetic signal and propagate the electromagnetic signal into the waveguide, and (ii) transmit a reflected electromagnetic signal from the waveguide. Additionally, the apparatus includes a reflecting component. The reflecting component is configured to provide a short in the waveguide along the length of the waveguide, and to move with a velocity to simulate a radar target having the velocity.

In another aspect, the present application describes a method. The method includes receiving an electromagnetic signal with an antenna. The method also includes coupling the signal from the antenna to a waveguide. The waveguide has a length and a port and the waveguide is a split-block construction waveguide including a seam between a first waveguide section and a second waveguide section. The first waveguide section and the second waveguide section form a waveguide cavity, and the seam corresponds to a low surface current location of a propagation mode of the waveguide. The method further includes reflecting at least a portion of the coupled signal with a reflecting component located in the waveguide, where the reflecting component moves with a velocity to simulate a radar target having the velocity. Additionally, the method includes coupling the reflected signal portion to the antenna and transmitting the coupled reflected signal portion with the antenna.

In yet another example, an apparatus is provided. The apparatus has a housing. The housing includes a bottom portion, a top portion coupled to the bottom portion at a seam, a port, and a waveguide. The waveguide has a length and is coupled to the port. The waveguide is a split-block construction waveguide, where a first waveguide section and a second waveguide section form a waveguide cavity. Additionally, the seam corresponds to a low surface current location of a propagation mode of the waveguide. The apparatus also includes a (i) a reflecting component configured to provide a short in the waveguide along the length of the waveguide, and (ii) a disk configured to move the reflecting component with a velocity to simulate a radar target having the velocity. Further, the apparatus includes an antenna coupled to the port of the housing. The antenna is configured to receive an electromagnetic signal and propagate the electromagnetic signal into the waveguide, and to transmit a reflected electromagnetic signal received from the waveguide.

In another aspect, the present application describes an apparatus. The apparatus may be configured for radar target simulation. The apparatus may further include a means for receiving an electromagnetic signal with an antenna. The apparatus also includes means for coupling the signal from the antenna to a means for propagating a signal. The means for propagating the signal has a length and a port and the means for propagating the signal is a split-block construction including a seam between a first means for propagating section and a second means for propagating a section. The first means for propagating section and the means for propagating waveguide section form a means for propagating cavity, and the seam corresponds to a low surface current location of a propagation mode of the means for propagating. The apparatus further includes means for reflecting at least a portion of the coupled signal located in the means for propagating, where the means for reflecting is configured to move with a velocity to simulate a radar target having the velocity. Additionally, the apparatus includes means for coupling the reflected signal portion to the means for transmitting the coupled reflected signal portion.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
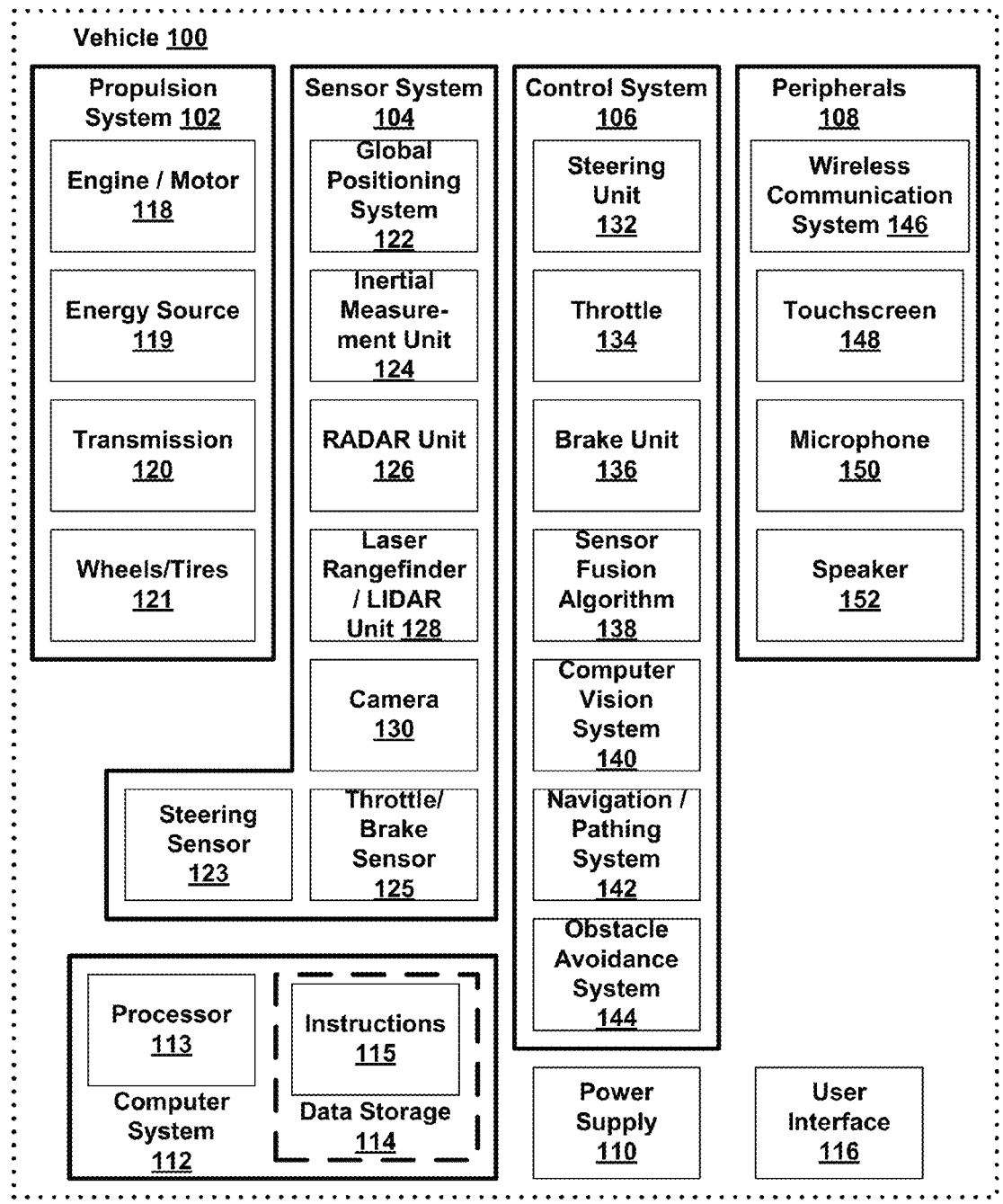
FIG. 1 is a functional block diagram illustrating a vehicle, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description relates to an apparatus and methods for calibration and testing of radar systems by simulating targets. In practice, simulating a radar target may be difficult. Traditional radar target simulation devices can involve large expensive devices, such as fans. Not only are traditional radar target simulation devices large and expensive, they can also be quite inaccurate. For example, when simulating a target having a given velocity, a fan-based target simulation device may also reflect radar signals in a manner corresponding to undesired target velocities. Thus, the target simulation may be somewhat inaccurate.

The target simulation apparatus and methods disclosed herein may be used to calibrate a radar system of an autonomous vehicle. Additionally, both (i) the target simulation apparatus and methods and (ii) the radar system on the autonomous vehicle may use a similar split-block construction for the waveguides in the respective system. Although the description presented herein is generally directed toward a waveguide having a split-block construction, the same methods and apparatuses may be used with waveguides that are constructed in other ways.

A radar system of an autonomous vehicle may include a plurality of antennas. Each antenna may be configured to (i) transmit electromagnetic signals, (ii) receive electromagnetic signals, or (iii) both transmit and receive electromagnetic signals. The antennas may form an array of antenna elements. Each antenna of the array may be fed (i.e., supplied with a signal) from waveguide. Additionally, the waveguide may communicate signals received by the various antennas to a receiver within the radar system.

A waveguide is a structure that conducts electromagnetic energy from one location to another location. In some instances, conducting electromagnetic energy with a waveguide has the advantage of having less loss than other conduction means. A waveguide will typically have less loss than other conduction means because the electromagnetic energy is conducted through a very low loss medium. For example, the electromagnetic energy of a waveguide may be conducted through air or a low loss dielectric.

In one embodiment, such as an air-filled waveguide, the waveguide will have a metallic outer conductor. However, in other embodiments, the waveguide may be formed by just the dielectric medium through which the energy propagates. In either embodiment, the size and shape of the waveguide define the propagation of the electromagnetic energy. For example, electromagnetic energy may bounce (or reflect) off the metallic walls of waveguide. In other embodiments, a dielectric medium may fully contain the electromagnetic energy (such as fiber optic transmission).

Based on the shape and the materials of the waveguide, the propagation of the electromagnetic energy will vary. The shape and the materials of the waveguide define the boundary conditions for the electromagnetic energy. Boundary conditions are known conditions for the electromagnetic energy at the edges of the waveguide. For example, in the metallic waveguide, assuming the waveguide walls are nearly perfectly conducting, the boundary conditions specify that there is no tangentially directed electric field at any of the wall sides. Once the boundary conditions are known, Maxwell's Equations can be used to determine how electromagnetic energy propagates through the waveguide.

Maxwell's Equations will define several modes of operation for any given waveguide. Each mode defines one specific way in which electromagnetic energy can propagate through the waveguide. Each mode has an associated cutoff frequency. A mode is not supported in a waveguide if the electromagnetic energy has a frequency that is below the cutoff frequency. By properly selecting both (i) waveguide dimensions and (ii) frequency of operation, electromagnetic energy may propagate through the waveguide in a specific mode. Often, waveguides are designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the waveguide. However, a suffix number of zero indicates there is not a variation of the field with respect to that direction. For example, a $TE_{10}$ mode indicates the waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e. two half wavelengths) and one half wavelength in height. Modes will be discussed further with respect to FIG. 3.

When operating a waveguide in a TE mode, the suffix numbers also indicate the number of field-maximums along the respective direction of the waveguide. For example, a $TE_{10}$ mode indicates that the waveguide has one electric field maximum the in width and zero maxima in the height. In another example, a $TE_{21}$ mode indicates that the waveguide has two electric field maxima in the width and one maximum in the height. At the point along the surface of the waveguide that corresponds to the position where the electric field is a maximum, the current induced in the waveguide is at a minimum. Thus, any disturbances in the waveguide at this low current point will have a minimal effect on the propagation of the electromagnetic energy. However, at the point along the surface of the waveguide that corresponds to the position where the electric field is a minimum, the current induced in the waveguide is at a maximum. Thus, any disturbances in the waveguide at this high current point may have a significant effect on the propagation of the electromagnetic energy.

Example systems within the scope of the present disclosure will now be described in greater detail. An example system with which the radar calibration unit may be used may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other objects that use radar are possible to use with the radar calibration unit as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to transmit a radio signal, receive reflected radio signals with at least one antenna in the radar system, process the received reflected radio signals, locate the objects that caused the reflections, and calculate an angle and a distance to each object that reflected the radio signal. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

A combination of various sensors (which could be termed input-indication and output-indication sensors), such as described above, and the computer system 112 could interact to provide an indication of an input provided to control a vehicle or an indication of the surroundings of a vehicle.

The computer system 112 could carry out several determinations based on the indications received from the input- and output-indication sensors. For example, the computer system 112 could calculate the direction (i.e. angle) and distance (i.e. range) to one or more objects that are reflecting radar signals back to the radar unit 126. Additionally, the computer system 112 could calculate a range of interest. The range of interest could, for example, correspond to a region where the computer system 112 has identified one or more targets of interest. Additionally or additionally, the computer system 112 may identify one or more undesirable targets. Thus, a range of interest may be calculated so as not to include undesirable targets.

In some embodiments, the computer system 112 may make a determination about various objects based on data that is provided by systems other than the radar system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
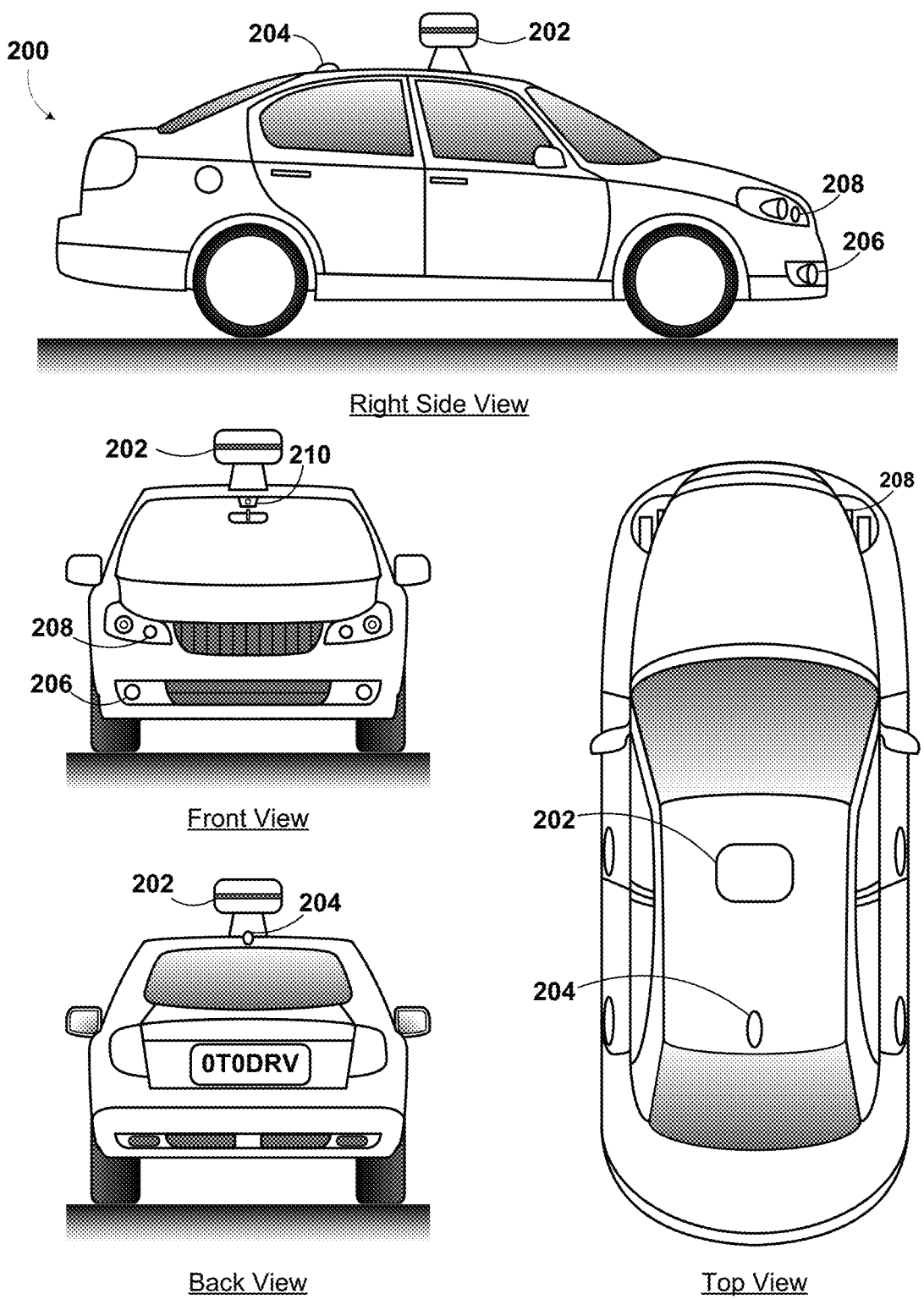
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radar 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
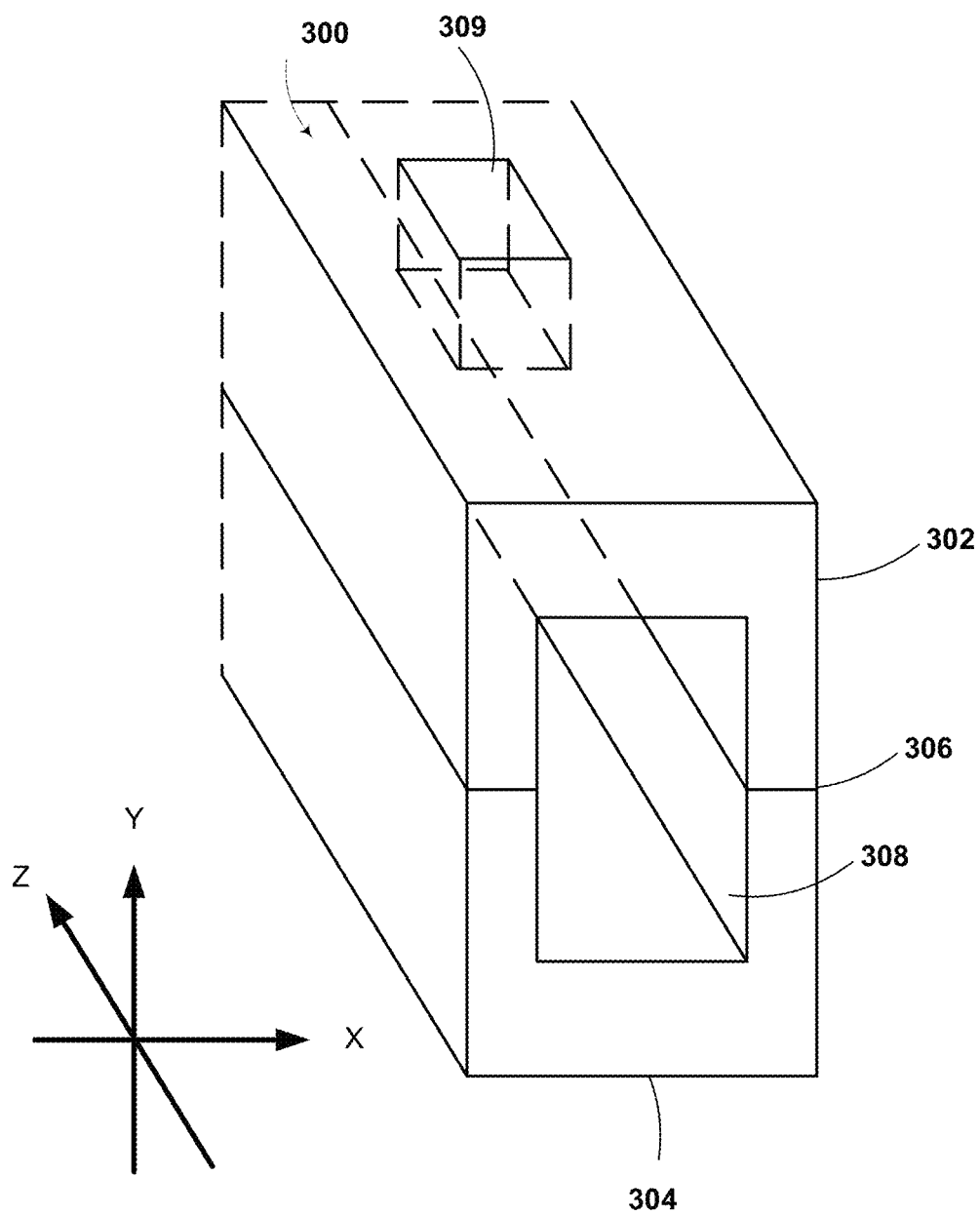
FIG. 3A illustrates an example isometric cross-section view of a waveguide.

FIG. 3A illustrates an example isometric cross-section view of a waveguide 300. The example waveguide 300 is formed with a top portion 302 and a bottom portion 304. The top portion 302 and a bottom portion 304 are coupled at seam 306. The waveguide includes a cavity 308. Within cavity 308, electromagnetic energy propagates during the operation of waveguide 300. The waveguide 300 may also include a feed 309. Feed 309 can be used to provide electromagnetic energy to cavity 308 in waveguide 300. Alternatively or additionally, feed 309 may be used to allow electromagnetic energy to leave waveguide 300. The example waveguide 300 of FIG. 3A features seam 306 at the middle point of the height of cavity 308. In various embodiments, the top portion 302 and a bottom portion 304 may be coupled together at various different positions along an axis of the waveguide.

Figure 3B:
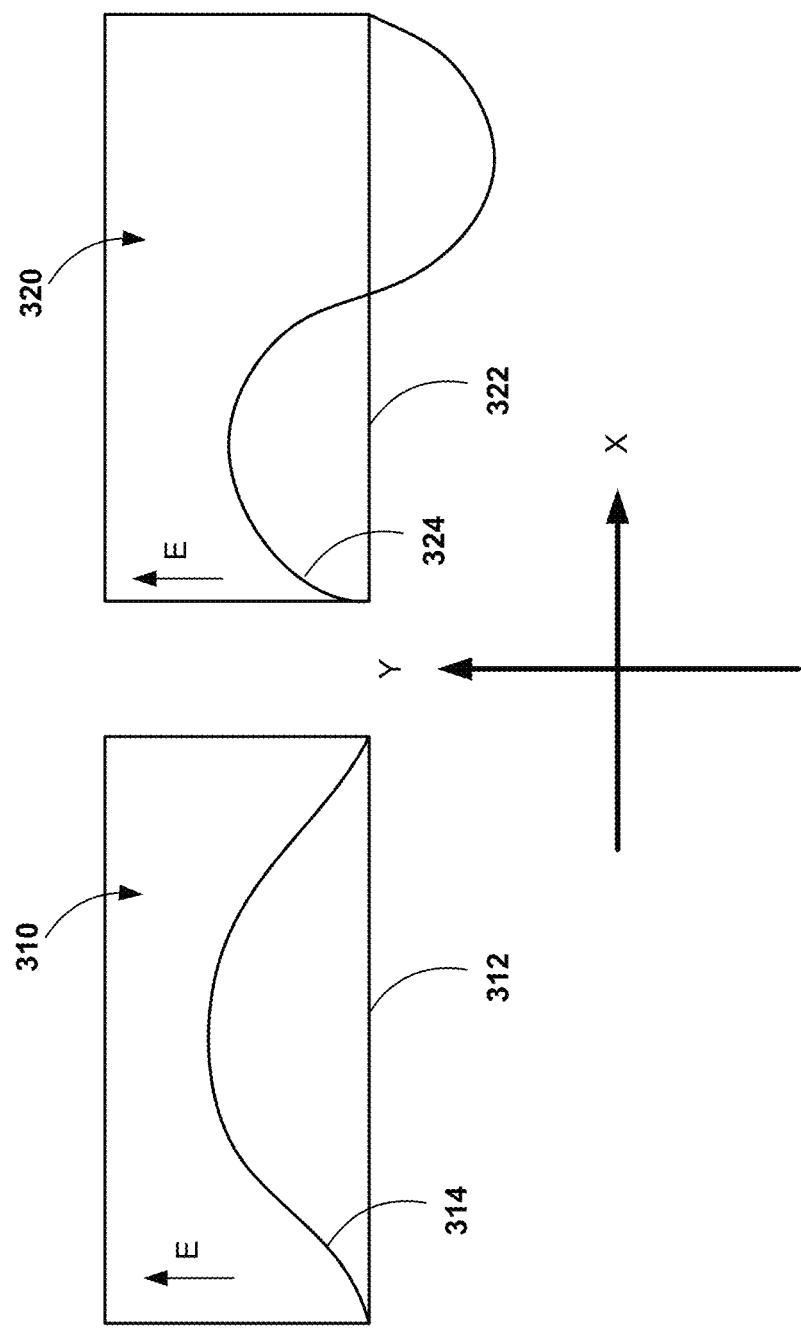
FIG. 3B illustrates two examples of modes operating in waveguides.

FIG. 3B illustrates two examples of modes operating in waveguides. Mode 310 is an example of a $TE_{10}$ mode operating in a cross section of metallic waveguide 312. Mode 320 is an example $TE_{20}$ mode operating in a cross section of metallic waveguide 322. Mode 310 and Mode 320 each have respective electromagnetic energy propagating down the length of the waveguide. As shown in FIG. 3A, the electromagnetic energy will propagate through the respective waveguides in a direction either in-to or out-of the page (i.e. along the Z-axis).

Because the example waveguide 312 and waveguide 322 are metallic, each has a similar set of boundary conditions. The boundary conditions result from specific physical phenomena that occur due to physics and the materials that form the waveguide. For example, in the metallic waveguide, assuming the waveguide walls are nearly perfectly conducting, the boundary conditions specify that there is no tangential electric field at any of the wall sides. Therefore, when a TE mode is conducted by the waveguide, there is no electric field at the location of a wall of the waveguide (where the wall is in the same direction as the electric field).

As shown in FIG. 3B, the example electric field of the electromagnetic energy is pointed in the vertical direction. Due to the boundary conditions, there is no vertically oriented electric field at the vertical walls of the waveguide. Therefore, for any propagation mode of electromagnetic energy to exist in the waveguide, the electric field has a value of zero in the vertical direction at the walls of the waveguide.

Waveguide 310 is an example of a $TE_{10}$ mode operating in a cross section of metallic waveguide 312. As previously discussed, the suffix 10 indicates the waveguide dimension is equal to one-half of the wavelength of the electromagnetic energy along the width of waveguide 310. However, the suffix number of zero indicates there is not a variation of the field with respect to the vertical direction. Because all TE modes have a magnetic field that is transverse (i.e. perpendicular) to the direction of propagation of the electromagnetic energy, and the energy is propagating either in to or out of the page, the electric field of mode 310 is completely in the vertical direction. Curve 314 indicated the relative electric field strength of mode 310 as a function of horizontal position in waveguide 312. As was already discussed with the boundary conditions, the electric field of mode 310 goes to zero at the edges of the waveguide 312. Further, the electric field of mode 310 has a maximum in the center of the waveguide 312.

As previously discussed, at the point along the surface of the waveguide 312 that corresponds to the position where the electric field is a maximum, the current induced in the waveguide 312 is at a minimum. However, at the point along the surface of the waveguide 312 that corresponds to the position where the electric field is a minimum, the current induced in the waveguide 312 is at a maximum.

Mode 320 is an example $TE_{20}$ mode operating in a cross section of metallic waveguide 322. The suffix 20 indicates the waveguide dimension is equal to a full wavelength (i.e. two half wavelengths) of the wavelength of the electromagnetic energy along the width of waveguide 322 and the zero indicates there is no variation of the field with respect to the vertical direction. Curve 324 indicated the relative electric field strength of mode 320 as a function of horizontal position in the waveguide 322. As was already discussed with the boundary conditions, the electric field of mode 320 goes to zero at the edges of the waveguide 322. Additionally, the electric field of mode 320 is equal to zero at the middle point of the X-axis. Further, the absolute value of the electric field of mode 320 has two maxima in waveguide 322, a maximum at one-quarter of the width and a maximum at three quarters of the width of waveguide 312. As indicated by curve 324, the electric field will have different signs at these two absolute maxima (one being positive and the other being negative), however the positive and negative maxima may change positions with each other depending on the specific embodiment.

FIG. 3B presents a $TE_{10}$ and a $TE_{20}$ mode. However, the systems and methods disclosed herein, may work with other modes of electromagnetic propagation as well. For example, $TE_{01}$ and a $TE_{02}$ modes would operate virtually identically to $TE_{10}$ and a $TE_{20}$ modes, except for being rotated 90 degrees (i.e. the electric field would be horizontally aligned rather than vertically). Further, higher order modes, such as $TE_{30}$ and a $TE_{21}$ may be used as well. Additionally, TM may also be used with the systems and methods disclosed herein. For simplicity, each mode is not shown in a figure.

Figure 3C:
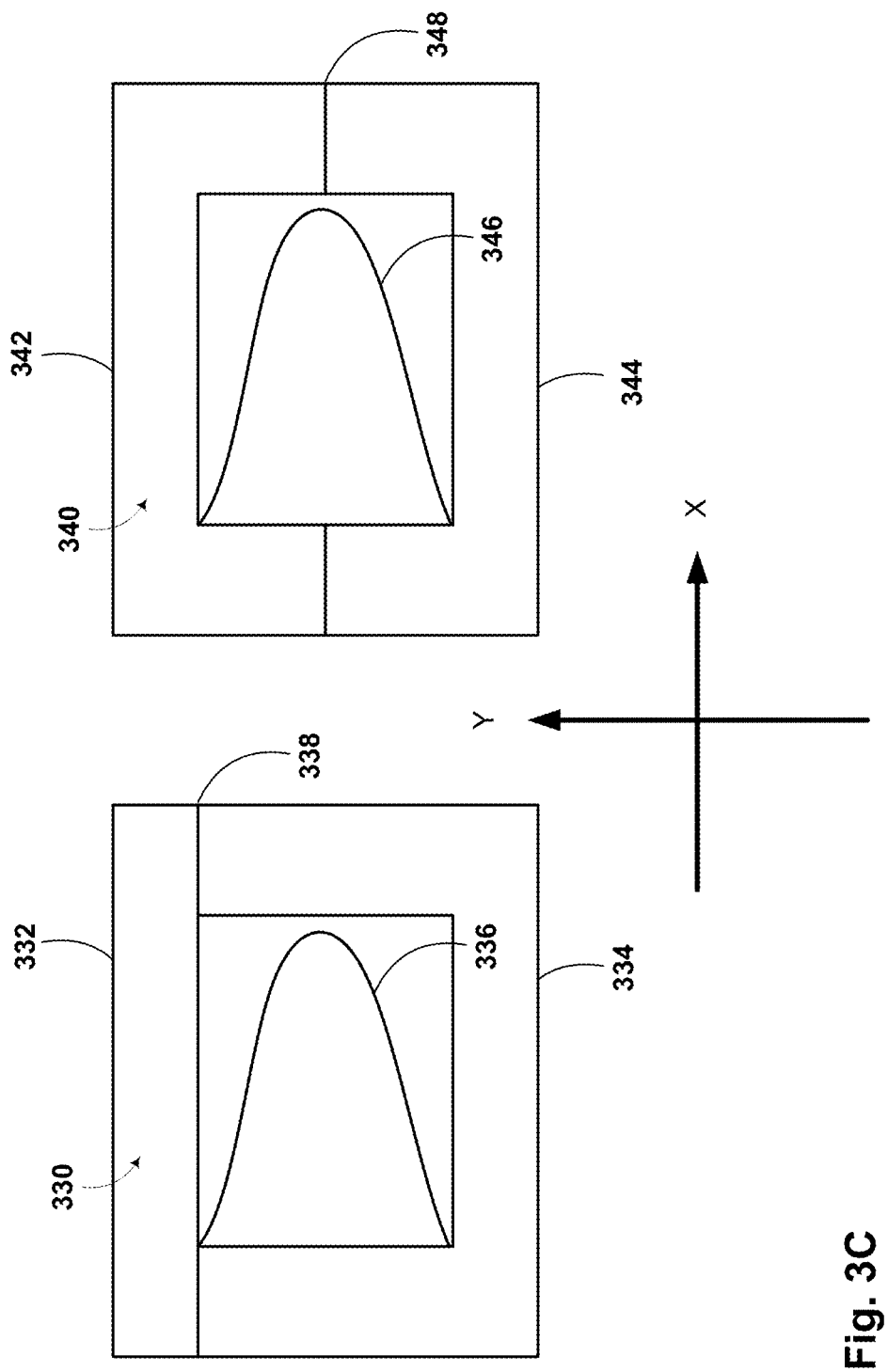
FIG. 3C illustrates two additional examples of modes operating in waveguides.

FIG. 3C illustrates two additional examples of modes operating in waveguides. Waveguide 330 has a conventional construction, while waveguide 340 has a split-block construction. The waveguide 330 has a top surface 332 that is coupled to a bottom surface 334. The bottom surface 334 features a waveguide cavity that includes the full height dimension of the waveguide. Once the top surface 332 is coupled to the bottom surface 334 at seam 338, the waveguide 330 is formed.

The waveguide 340 has a top surface 342 that is coupled to a bottom surface 344. The bottom surface 344 features a waveguide cavity that includes half the height dimension of the waveguide. The top surface 342 features a waveguide cavity that includes half the height dimension of the waveguide. Once the top surface 342 is coupled to the bottom surface 344 at seam 348, the waveguide 330 with a full height is formed.

Waveguide 330 may conduct representative electromagnetic energy 336. As shown in FIG. 3C, waveguide 330 may conduct representative electromagnetic energy 336 in the $TE_{01}$ mode. Waveguide 340 may conduct representative electromagnetic energy 346. As shown in FIG. 3C, waveguide 340 may conduct representative electromagnetic energy 346 in the $TE_{01}$ mode. While operating in the $TE_{01}$ mode, the waveguides are operating in a similar mode to waveguide 310 of FIG. 3B. The electric field of the TE01 mode in waveguides 330 and 340 are rotated 90 degrees compared to the electric field of waveguide 310 of FIG. 3B.

As previously discussed, at the point along the surface of the waveguide that corresponds to the position where the electric field is a maximum, the current induced in the waveguide is at a minimum. Similarly, at the point along the surface of the waveguide that corresponds to the position where the electric field is a minimum, the current induced in the waveguide is at a maximum. In waveguide 330, the current induced in the waveguide is at a minimum half way up the Y-axis of the waveguide and the current induced in the waveguide is at a maximum at the top and bottom of the Y-axis of the waveguide. In waveguide 330, one of the two the maximum current positions corresponds to the seam 338. Disturbances in the waveguide at this high current point may have a significant effect on the propagation of the electromagnetic energy. Therefore, when the seam is formed, it may require precision machining. Alternatively, if the seam is not precise and causes a disturbance, the waveguide 330 may not perform exactly as designed. The radar system may need to have a compensation introduced to correct for the defect introduced by the disturbance of the seam.

In waveguide 340, the current induced in the waveguide is at a minimum half way up the Y-axis of the waveguide and the current induced in the waveguide is at a maximum at the top and bottom of the Y-axis of the waveguide. In waveguide 340, neither of the two the maximum current positions corresponds to the seam 348. The seam 348 is located at a low-current position within the waveguide. Thus, the seam 348 may not cause much of a disturbance with the propagation of electromagnetic energy in the waveguide. Because the seam 348 will have little or no impact on the propagation of electromagnetic energy in the waveguide 340, waveguide 340 may be constructed with larger tolerances than waveguide 330. Therefore, the machining required to produce waveguide 340 is less intensive than that required to produce waveguide 330.

Figure 3D:
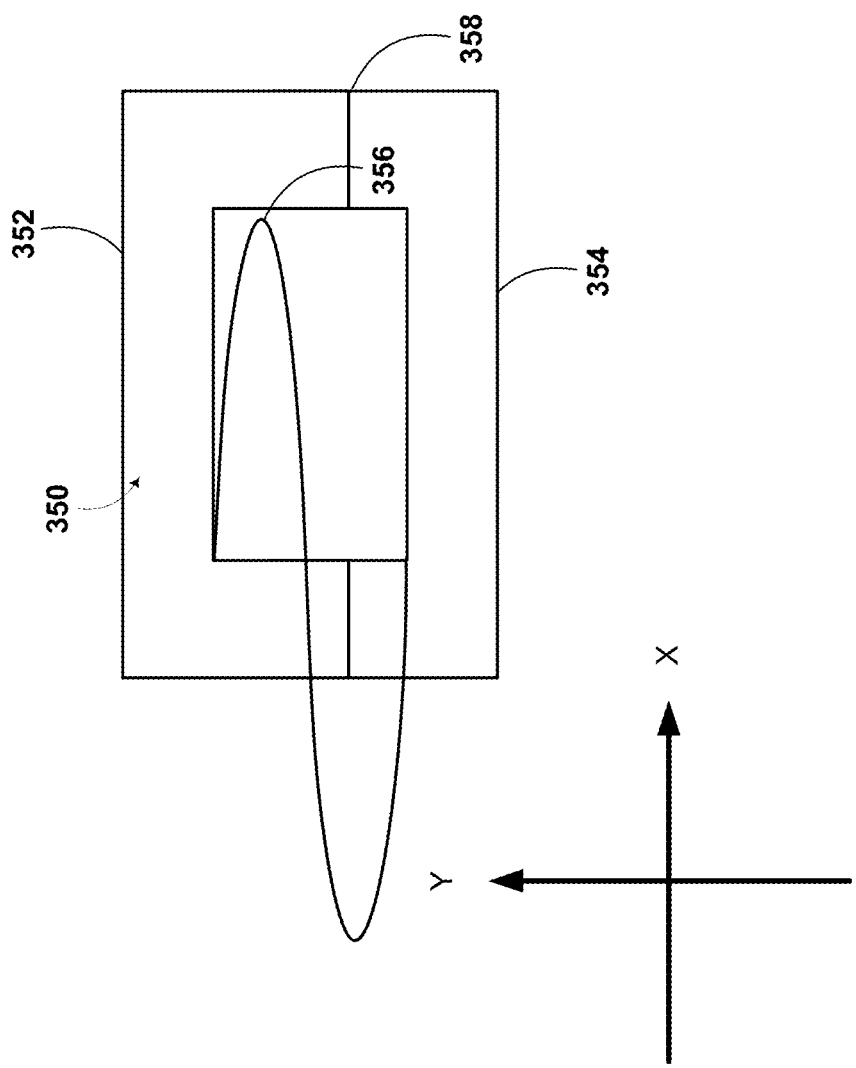
FIG. 3D illustrates another example of mode operating in a waveguide.

FIG. 3D illustrates another example of mode operating in a waveguide. Waveguide 350 features an embodiment of a split-block construction of waveguide channels for radar frontend. The waveguide 350 has a top surface 352 that is coupled to a bottom surface 354. The bottom surface 354 features a waveguide cavity that includes one quarter of the height dimension of the waveguide. The top surface 352 features a waveguide cavity that includes three quarter of the height dimension of the waveguide. Once the top surface 352 is coupled to the bottom surface 354 at seam 358, the waveguide 350 with a full height is formed.

Waveguide 350 may conduct representative electromagnetic energy 356. As shown in FIG. 3C, waveguide 350 may conduct representative electromagnetic energy 356 in the $TE_{02}$ mode. While operating in the $TE_{02}$ mode, the waveguides are operating in a similar mode to waveguide 320 of FIG. 3B. The electric field of the $TE_{02}$ mode in waveguide 350 is rotated 90 degrees compared to the electric field of waveguide 320 of FIG. 3B.

In waveguide 350, the current induced in the waveguide is at a minimum one quarter of the way up the Y-axis of the waveguide and at three quarter of the way up the Y-axis of the waveguide. The current induced in the waveguide is at a maximum at the top and bottom of the Y-axis of the waveguide and also in the middle of the Y-axis of the waveguide. In waveguide 350, none of the three maximum current positions corresponds to the seam 358. Instead, the seam 358 is located at a low-current position within the waveguide. Thus, the seam 358 may not cause much of a disturbance with the propagation of electromagnetic energy in the waveguide. Because the seam 358 will have little or no impact on the propagation of electromagnetic energy in the waveguide 350, waveguide 350 may be constructed with larger tolerances than waveguide 330. Therefore, the machining required to produce waveguide 350 is less intensive than that required to produce waveguide 330.

Figure 3E:
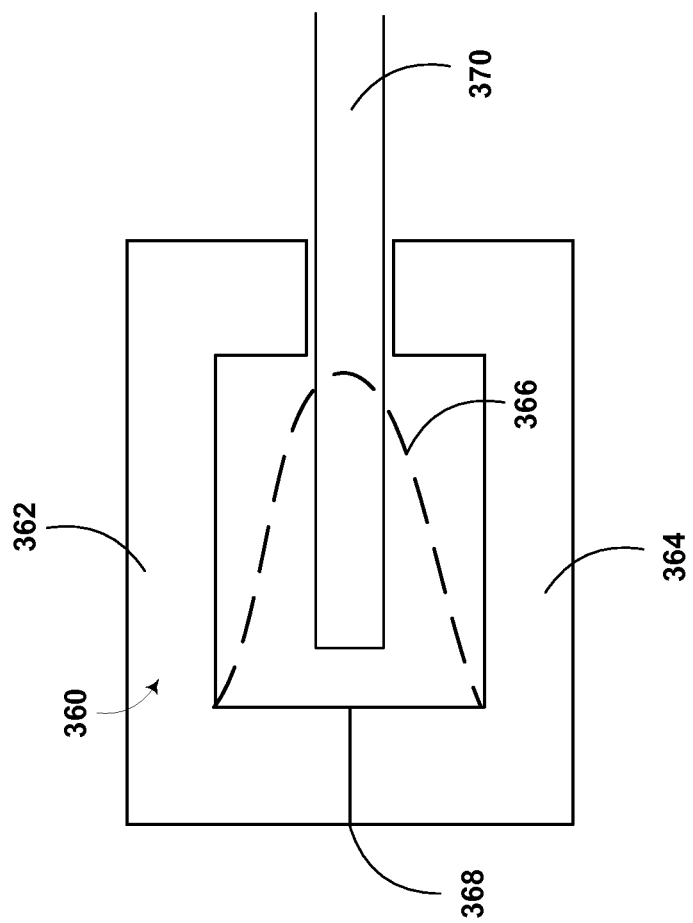
FIG. 3E illustrates another example of mode operating in a waveguide having a short.

FIG. 3E illustrates another example of mode operating in a waveguide having a short. In waveguide 360, similar to waveguide 340 above, the current induced in the waveguide is at a minimum half way up the Y-axis of the waveguide and the current induced in the waveguide is at a maximum at the top and bottom of the Y-axis of the waveguide. In waveguide 360, neither of the two the maximum current positions corresponds to the seam 368. The seam 368 is located at a low-current position within the waveguide. Thus, the seam 368 may not cause much of a disturbance with the propagation of electromagnetic energy in the waveguide. Waveguide 360 also includes an opening through which a reflecting element 370 (i.e. a shorting element, as a short in a waveguide may cause reflections) may enter the waveguide 360. The reflecting element 370 may correspond to the maximum field of the electromagnetic energy 346. Additionally, the reflecting element 370 may be coupled to a disk, as described herein. The disk may cause the reflecting element 370 to move throughout the waveguide and reflect the electromagnetic energy in encounters. In some examples, the reflecting element 370 may be a metallic element, such as a metal tab. In other examples, the reflecting element 370 may be made of any material that may change the impedance of the waveguide and reflect a signal.

Figure 4:
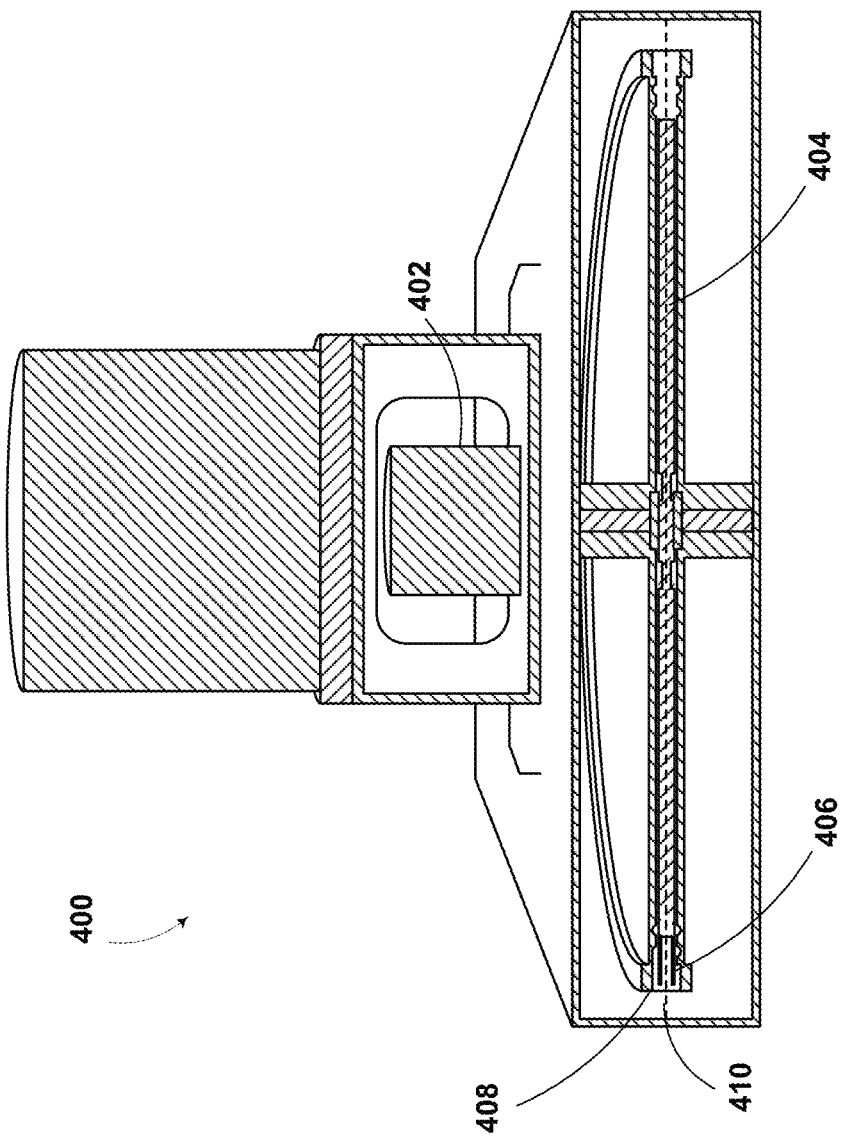
FIG. 4 illustrates an example apparatus including a high speed tunable short.

Waveguides, such as those described with respect to FIG. 3 may be used on both the vehicle as well as part of a radar calibration device. FIG. 4 illustrates an example radar calibration apparatus including a high speed tunable short. As shown in a FIG. 4, the apparatus 400 may include a motor 402 coupled to a disk 404 within a housing 412. The disk 404 may include a tab 406 that extends into waveguide 408. Both the disk 404 and the waveguide 408 may be centered on a common plane 410. The plane 410 may correspond to the seam of the waveguide (as previously discussed).

Additionally, the housing 412 may be constructed in a manner where the common plane 410 is a location where two parts of the housing 412 come together. In one example an upper portion of the waveguide 408 and an upper portion of a region where disk 404 is located may be on one housing part. The second housing part may have a lower portion of the waveguide 408 and a lower portion of a region where disk 404 is located. Thus, when the two housing portions are brought together, they form the waveguide 408 having a seam on plane 410. The disk 404 may be placed within the housing as well.

The motor 402 may be configured to rotate the disk 404. While the disk 404 rotates, the tab 406 of the disk 404 may move through the waveguide 408. The waveguide 408 may also have an antenna (not shown) configured to receive an electromagnetic signal (i.e. radar signal) and re-transmit the electromagnetic signal reflected from the tab 406. While the present disclosure generally uses the term disk to describe the element of disk 404, other objects may function similarly and may be used within the present disclosure. For example, any object that may be rotated can be used in the place of the disk 404, such as a drum, a plate, a rotor, a blade, or other objects.

During the operation of the radar calibration apparatus 400, the disk 404 may be spun with a rotational velocity that causes the tab 406 to move through the waveguide with a linear speed equal to that of the target to be simulated. To simulate the target, the tab 406 creates a short within the waveguide. This short reflects electromagnetic energy that exists in the waveguide. The reflected signal will have a Doppler shift based on the speed at which the short reflects the electromagnetic energy.

When objects reflect radar signals, each signal may be reflected with a frequency shift (i.e. Doppler shift, as presented by Equation 1 below). The velocity of the object that causes the radar reflection causes the frequency shift. In Equation 1, $\Delta f$ is the frequency shift associated with a reflection, $\Delta v$ is the relative velocity difference between the transmitter and the reflector, $v_9$ is the speed (i.e. group velocity) of the electromagnetic energy in the waveguide, and $f_0$ is the carrier frequency of the transmitted radar signal.

$$\Delta f = \frac{\Delta v}{v_g} f_0 \quad \text{EQUATION 1}$$

Thus, the short 406 will induce a frequency shift of $\Delta f$ in the signal it reflects. After the short 406 reflects the signal, the signal may propagate down the waveguide to an antenna. The antenna may transmit the reflected signal so a radar unit in the vehicle (or other object having a radar system) can receive the signal. The radar unit may interpret the reflected signal as a signal created by a radar target having a speed equal to that of the speed of the short. In some examples, other kinematic parameters may be simulated as well. For example, velocity, acceleration, and jerk may all be simulated in a similar manner based on the movement of the reflecting component.

In one example, the radar target simulation device may be designed to operated with electromagnetic frequencies in the range of approximately 60 GHz to 90 GHz. This range may be chosen for one example, in part, because automotive radar systems may typically operate around 77 GHz. In some examples, the waveguide may have a standard size, such as a WR-12 or WR-10. A WR-12 waveguide may support the propagation of electromagnetic waves between 60 GHz (5 mm wavelength) and 90 GHz (3.33 mm wavelength). Additionally, a WR-12 waveguide may have the internal dimensions of approximately 3.1 mm by 1.55 mm. A WR-10 waveguide may support the propagation of electromagnetic waves between 75 GHz (4 mm wavelength) and 110 GHz (2.727 mm wavelength). Additionally, a WR-12 waveguide may have the internal dimensions of approximately 2.54 mm by 1.27 mm. The dimensions of the WR-12 and the WR-10 waveguides are presented for examples. Other dimension are possible as well.

In one example, the total path length of the waveguide may be about 18.6 inches (0.472 meter). Because the speed of propagation (i.e. $v_9$ of Equation 1 above) for a 76.5 GHz wave in a WR12 waveguide is approximately $2.32 \times 10^8$ meters per second, the waveguide has an effective path length of 25.0" (0.635 meter). In one example configuration, operating the motor at 2100 RPM can simulate a target at approximately 49 miles per hour (MPH). Spinning the motor over 4000 RPM, may enable target simulation of target that exceed 100 MPH.

Figure 5:
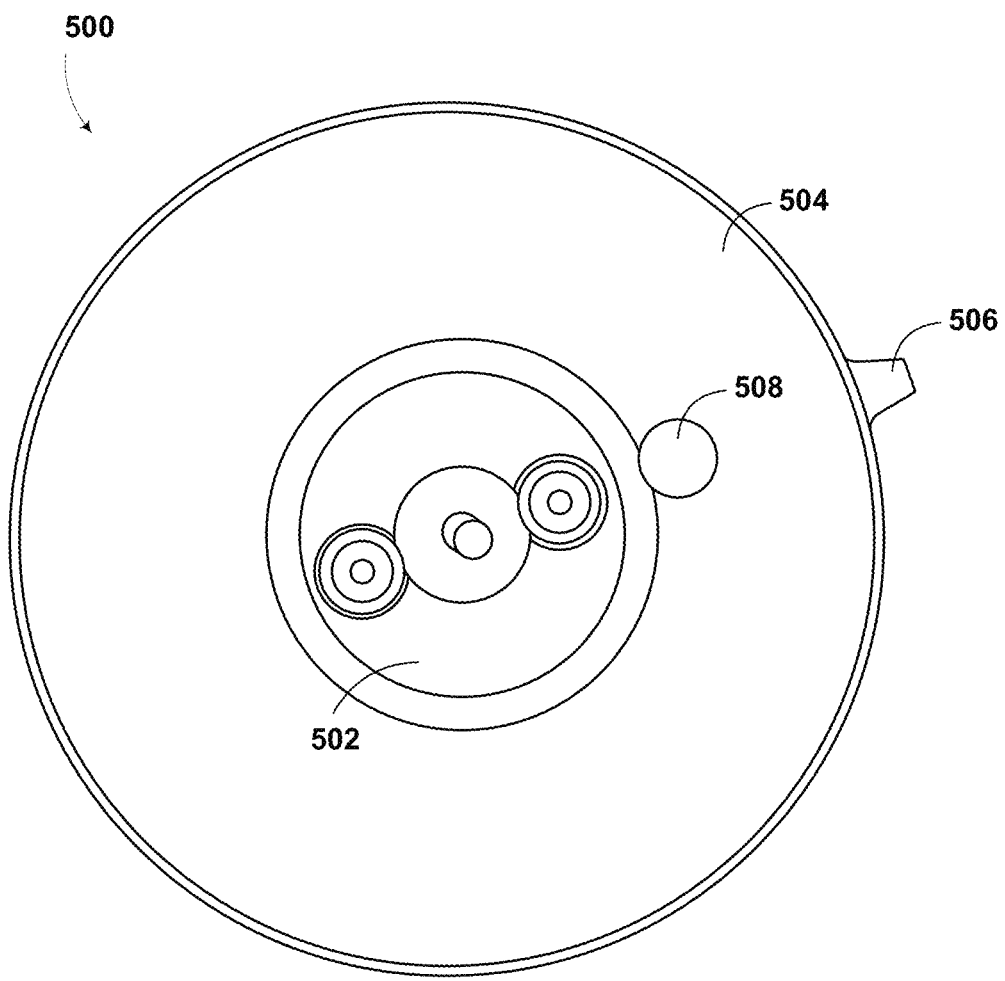
FIG. 5 illustrates an example disk including a high speed tunable short.

FIG. 5 illustrates an example disk 500 including a high speed tunable short 506. The disk 500 may be configured to operate in an apparatus similar to those described with respect to FIGS. 4, 6, and 7. The disk 500 may include a disk plate 504. The disk plate 504 may be a metallic or other material. The disk plate may have a central region 502 that contains a spindle that may be connected to a motor (such as that previously described in FIG. 4). The motor may spin the disk via the spindle in the central region 502. Additionally, the central region 502 may contain additional hardware configured to couple the central region 503 to the disk plate 504.

The disk 500 may also include a shorting tab 506. The shorting tab 506 may be configured to extend beyond the outer diameter of the disk plate 504. As the disk 500 rotates, the shorting tab may move through a waveguide channel (shown in other figures). The shorting tab 506 may be configured to short (e.g., cause a reflection) electromagnetic energy that is propagating in the waveguide.

Because the shorting tab 506 may increase the mass on one side of the disk 500, different features may be used to balance the disk 500. In one example, as shown in FIG. 5, mass may removed from the disk via a hole 508. Hole 508 may cause the disk 500 to be balanced when the disk 500 is spun. In other embodiments, disk 500 may have at least one additional shorting tab, similar to shorting tab 506 added to balance the disk. Further, mass may be added (or removed) from the disk 500 in other positions to balance the mass of shorting tab 506.

Figure 6:
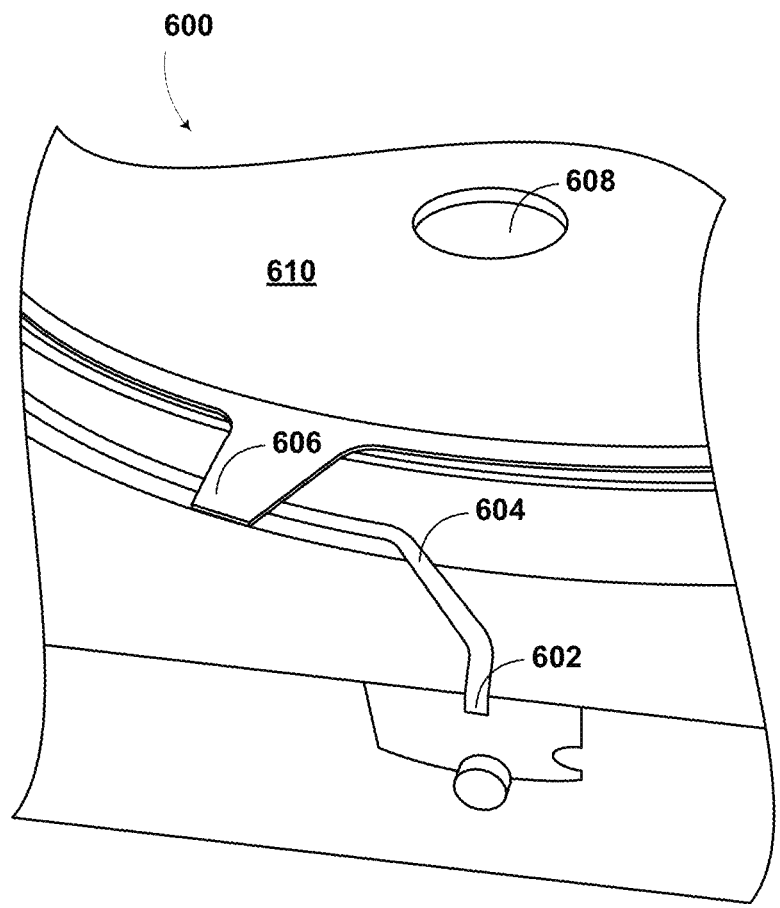
FIG. 6 illustrates an example disk including a high speed tunable short and a waveguide.

FIG. 6 illustrates an example disk 610 including a high speed tunable short 606 and a waveguide 604. FIG. 6 shows a cutaway view of apparatus from FIG. 4 and the disk 504 of FIG. 5. The disk 610 shown in FIG. 6 may include similar features as described with respect to disk 504 of FIG. 5. For example, disk 610 may include a mass reduction component 608 and a shorting tab 606. Both may function in a similar manner as previously described. Further, the waveguide 604 of FIG. 6 may be similar to the previously discussed waveguides. As shown in FIG. 6, the waveguide 604 may be split along the seam that separates an upper portion from a lower portion of the waveguide 604.

Additionally, FIG. 6 shows a waveguide port 602. The waveguide port 602 is the point on the waveguide where an electromagnetic signal may couple into or out of the waveguide. Additionally, an antenna (not shown), such as a horn antenna, may be coupled to the waveguide port 602. However, in some examples, an open waveguide port 602 may also function as an antenna as well. The waveguide port 602, whether coupled to a discrete antenna or functioning as an antenna on its own, may receive electromagnetic radiation and couple at least a portion of the energy into the waveguide 604. The electromagnetic energy may propagate down the length of the waveguide until at least a portion of it is reflected. It may be reflected by either the shorting tab 606 (which may be stationary or in motion) or by an end of the waveguide. After at least a portion of the electromagnetic energy is reflected, it may propagate back through the waveguide 604 to the waveguide port 602. Once the reflected electromagnetic energy returns to the waveguide port 602, it may be retransmitted to the outside of the radar target simulating unit via an antenna (or via the waveguide port 602 itself).

Figure 7:
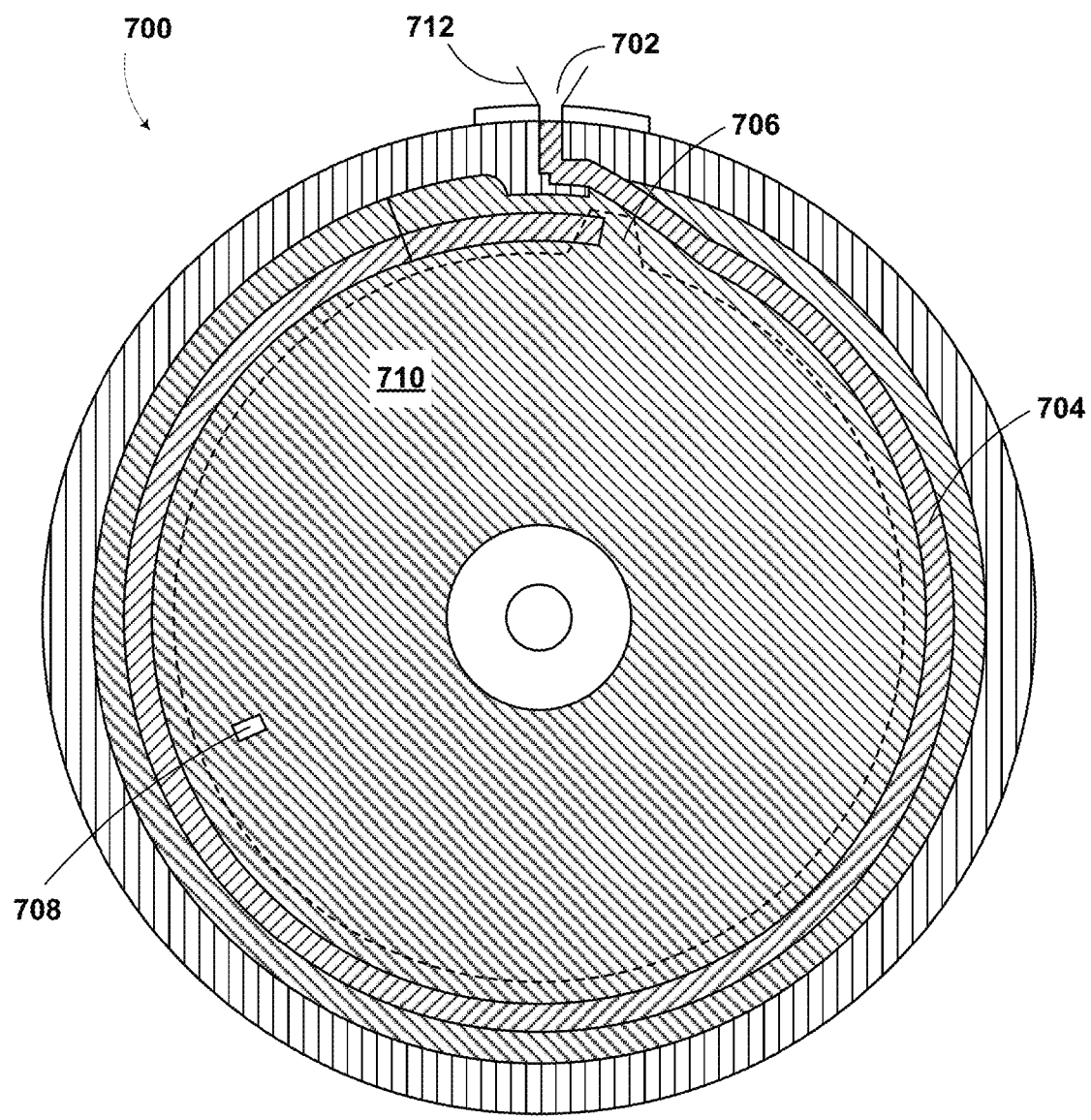
FIG. 7 illustrates another view of an example disk including a high speed tunable short.

FIG. 7 illustrates another view of an example disk 710 including a high speed tunable short 706 as part of a radar target simulating unit 700. FIG. 7 presents a top-down view of a setup similar to that disclosed with respect to FIG. 6. Further, the waveguide 704 of FIG. 7 may be similar to the previously discussed waveguides. As shown in FIG. 7, the waveguide 704 may start at the waveguide port 702 and have a waveguide end after the waveguide approximately completes a circle around the disk 710. Additionally, the radar target simulating unit 700 may also include a tachometer 708 (or other device) configured to measure the rotational velocity of the disk 710. Additionally, an antenna 712 may be coupled to the waveguide port 702 to allow electromagnetic energy to be couple into and out of the waveguide 704.

Figure 8:
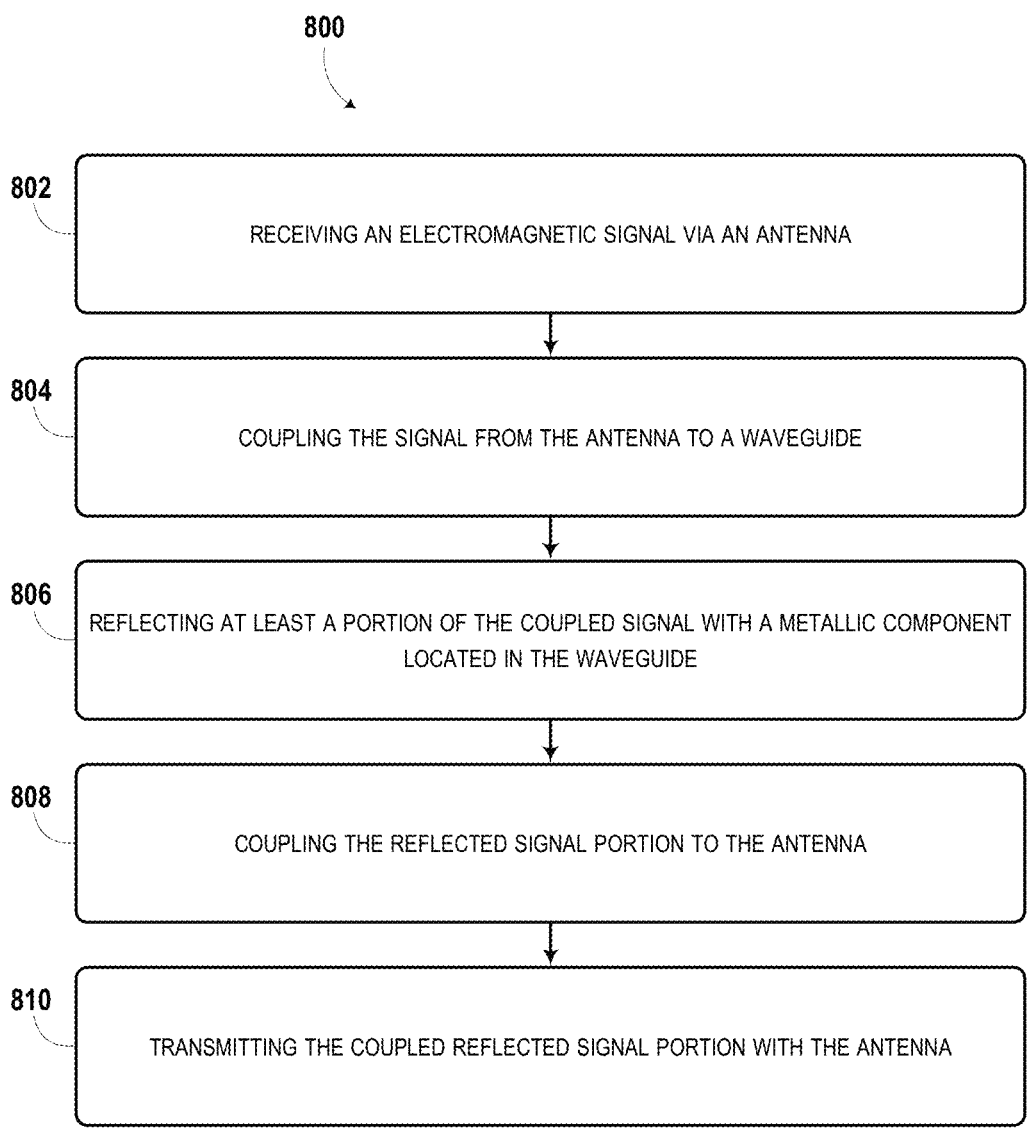
FIG. 8 illustrates a method for simulating radar targets with the high speed tunable short.

FIG. 8 illustrates a method for simulating radar targets with the high speed tunable short. At block 802, the method includes receiving an electromagnetic signal via an antenna. The antenna may be a wide-bandwidth antenna, such a horn antenna. The wide-bandwidth antenna may allow radar targets to be simulated with wide bandwidth of radar signals. However, in other examples, the antenna may be a narrow bandwidth antenna. In yet further examples, the antenna may be an open waveguide port. The open waveguide port may function as an antenna.

The antenna may be configured to receive a radar signal that was transmitted by a radar unit. For example, the radar unit may be a radar unit associated with an autonomous vehicle. The radar unit of the autonomous vehicle may be configured to transmit radar signals and receive their reflections. Based on the reflections, speed and location information may be determined for the objects that caused the reflections. The antenna of the radar target simulation device may receive the radar signal (i.e. electromagnetic wave) transmitted from the autonomous vehicle's radar unit and couple a portion of the radar signal propagating in free space into a waveguide.

At block 804, the method includes coupling the signal from the antenna to a waveguide. After the antenna receives a signal at block 802, the antenna may couple the signal into the waveguide. By coupling the signal the unguided signal from free space is converted to a guided wave that can propagate within the waveguide. As previously discussed, the waveguide may have dimensions that correspond to a frequency range of operation for electromagnetic signals that it may propagate.

Additionally, the waveguide may have a length and a port. The length of the waveguide may be a length based on a curved path around a disk located within the radar target simulation device. The port may be an opening in the waveguide that allows a wave to enter or exit the waveguide. The port may either be coupled to an antenna or function as an antenna itself.

As previously discussed, the waveguide into which the signal is coupled may be a split-block construction waveguide having a seam between a first waveguide section and a second waveguide section. The first waveguide section and the second waveguide section form a waveguide cavity and the seam corresponds to a low surface current location of a propagation mode of the waveguide. Thus, the waveguide may be constructed in a way to mitigate disturbances caused by the point where the waveguide has a seam.

At block 806, the method includes reflecting at least a portion of the coupled signal with a reflecting component located in the waveguide. The reflecting component may be a tab on a rotating disk. The reflecting component is configured to move with a velocity equal to that of the target to be simulated. Thus, in one example, the disk may be rotated with an angular velocity to cause a linear velocity of the reflecting component to be equal to the velocity of the desired target. When the signal propagates through the waveguide, the reflecting component acts as a short. When signal encounters the moving short in the waveguide, it is reflected. This reflection from a moving short introduces a Doppler shift in the frequency of the signal. Thus, the reflected signal has a frequency that is based on both the frequency of the signal, as well as the speed of the reflecting component when it is reflected.

At block 808, the method includes coupling the reflected signal portion to the antenna. When the signal is reflected from the short, it changes directions within the waveguide. The signal will return to the port of the waveguide. By coupling the signal, the guided signal from the waveguide is converted to an unguided wave that can propagate in free space.

At block 810, the method includes transmitting the coupled reflected signal portion with the antenna. The transmission antenna may be the same antenna that received the signal at block 802. For example, the antenna may be a wide-bandwidth horn antenna. In another example, the antenna may be the opening of the waveguide acting as the antenna aperture. Once the antenna transmits the signal, the radar unit of the autonomous vehicle that initially created the radar signal may receive it. The autonomous vehicle may interpret the received signal as being caused by an object having a velocity proportional to that of the reflecting component that caused the signal reflection. Because the wave moves more slowly in the waveguide than in freespace, the speed at which the reflecting element is moving when it causes the reflections is slower than the speed of the target to be simulated. For example, in a WR-12 waveguide, an electromagnetic wave moves approximately 77% the speed of the wave in free space. Thus, to simulate a target, the reflecting element may move at approximately 77% of the target speed.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. An apparatus comprising:
   a waveguide having a length and a port, wherein the waveguide is a split-block construction waveguide comprising a seam between a first waveguide section and a second waveguide section, wherein the first waveguide section and the second waveguide section form a waveguide cavity, and wherein the seam corresponds to a low surface current location of a propagation mode of the waveguide;

an antenna coupled to the port of the waveguide, wherein the antenna is configured to:

receive an electromagnetic signal and propagate the electromagnetic signal into the waveguide, and transmit a reflected electromagnetic signal from the waveguide; and a reflecting component configured to:

provide a short in the waveguide along the length of the waveguide, and to move with a velocity to simulate a radar target having the velocity.

2. The apparatus according to claim 1, wherein the reflecting component comprises a metallic component coupled to a disk and the disk is configured to spin.

3. The apparatus according to claim 2, wherein the waveguide is arranged in a direction around the disk.

4. The apparatus according to claim 3, wherein the length of the waveguide extends from the port in the direction around the disk.

5. The apparatus according to claim 2, wherein the disk is configured to be in a plane defined by the seam of the waveguide.

6. The apparatus according to claim 2, wherein the disk is configured to have at least one mass-reduction component configured to balance the disk based on a mass of the reflecting component.

7. The apparatus according to claim 6, wherein the at least one mass-reduction component is a hole in the disk.

8. A method comprising:

receiving an electromagnetic signal via an antenna;

coupling the signal from the antenna to a waveguide, wherein the waveguide has a length and a port and the waveguide is a split-block construction waveguide comprising a seam between a first waveguide section and a second waveguide section, wherein the first waveguide section and the second waveguide section form a waveguide cavity, and wherein the seam corresponds to a low surface current location of a propagation mode of the waveguide;

reflecting at least a portion of the coupled signal with a reflecting component located in the waveguide, wherein the reflecting component moves with a velocity to simulate a radar target having the velocity;

coupling the reflected signal portion to the antenna; and transmitting the coupled reflected signal portion with the antenna.

9. The method according to claim 8, wherein the reflecting component comprises a metallic component coupled to a disk and wherein the method further comprises spinning the disk.

10. The method according to claim 9, wherein the waveguide is arranged in a direction around the disk.

11. The method according to claim 10, wherein the length of the waveguide extends from the port in the direction around the disk.

12. The method according to claim 9, further comprising spinning the disk in a plane defined by the seam of the waveguide.

13. The method according to claim 9, wherein the disk is configured to have at least one mass-reduction component configured to balance the disk based on a mass of the reflecting component.

14. The method according to claim 13, wherein the at least one mass-reduction component is a hole in the disk.

15. An apparatus comprising:

a housing having:

a bottom portion, a top portion coupled to the bottom portion at a seam, a port, a waveguide having a length coupled to the port, wherein the waveguide is a split-block construction waveguide, wherein a first waveguide section and a second waveguide section form a waveguide cavity, and wherein the seam corresponds to a low surface current location of a propagation mode of the waveguide, a reflecting component configured to provide a short in the waveguide along the length of the waveguide; and a disk configured to move the reflecting component with a velocity to simulate a radar target having the velocity; and an antenna coupled to the port of the housing, wherein the antenna is configured to:

receive an electromagnetic signal and propagate the electromagnetic signal into the waveguide, and transmit a reflected electromagnetic signal from the waveguide.

16. The apparatus according to claim 15, wherein the disk is configured to spin and a measurement unit is configured to measure the velocity of the disk.

17. The apparatus according to claim 15, wherein the waveguide is arranged in a direction around the disk.

18. The apparatus according to claim 17, wherein the length of the waveguide extends from the port in the direction around the disk.

19. The apparatus according to claim 15, wherein the disk is disposed in a plane defined by the seam of the waveguide.

20. The apparatus according to claim 15, further comprising at least one mass-reduction component configured to balance the disk based on a mass of the reflecting component.

* * * * *